United States Patent
Norris

(10) Patent No.: US 10,634,493 B2
(45) Date of Patent: Apr. 28, 2020

(54) MULTI-DIMENSIONAL LEVEL TOOL WITH LEVEL INDICATING DEVICES

(71) Applicant: Robert Layne Norris, Clovis, NM (US)

(72) Inventor: Robert Layne Norris, Clovis, NM (US)

( * ) Notice: Subject to any disclaimer, the term of this patent is extended or adjusted under 35 U.S.C. 154(b) by 136 days.

(21) Appl. No.: 15/659,401

(22) Filed: Jul. 25, 2017

(65) Prior Publication Data

US 2017/0322025 A1 Nov. 9, 2017

Related U.S. Application Data

(60) Provisional application No. 62/458,137, filed on Feb. 13, 2017.

(51) Int. Cl.
*G01C 9/06* (2006.01)
*G01C 15/10* (2006.01)
*G01C 9/18* (2006.01)
*G01C 9/12* (2006.01)
*G01C 9/16* (2006.01)

(52) U.S. Cl.
CPC ............... *G01C 9/06* (2013.01); *G01C 9/12* (2013.01); *G01C 9/16* (2013.01); *G01C 9/18* (2013.01); *G01C 15/10* (2013.01)

(58) Field of Classification Search
CPC . G01C 15/10; G01C 9/06; G01C 9/12; G01C 9/16; G01C 9/18
USPC .............................................. 33/371, 366.11
See application file for complete search history.

(56) References Cited

U.S. PATENT DOCUMENTS

| | | | |
|---|---|---|---|
| 39,124 A | 7/1863 | Davison et al. | |
| 108,875 A | 11/1870 | Buckwalter | |
| 312,548 A * | 2/1885 | Atkinson | G01C 15/00 33/273 |
| 567,832 A | 9/1896 | Johns | |
| 613,946 A | 11/1898 | Starrett | |
| 817,515 A | 4/1906 | Polimeni | |
| 834,964 A | 11/1906 | Broderick | |
| 922,171 A | 5/1909 | Loeven | |
| 1,022,396 A | 4/1912 | Allen | |
| 1,319,545 A | 10/1919 | Weston | |
| 1,435,054 A | 11/1922 | Drummond | |
| 2,466,829 A | 4/1949 | Sprinkel | |
| 2,536,447 A | 1/1951 | Kirton | |
| 2,750,677 A | 6/1956 | Wirth | |
| 2,906,031 A | 9/1959 | Rice | |
| 2,910,782 A * | 11/1959 | Krantz | G01C 9/18 33/366.22 |
| 3,803,722 A | 4/1974 | Hinkley | |
| 4,531,301 A | 7/1985 | Tau | |
| 4,660,292 A * | 4/1987 | Richardson | B43L 7/005 33/342 |
| 5,269,066 A | 12/1993 | Walters | |
| D353,111 S | 12/1994 | Meador | |
| 5,531,031 A * | 7/1996 | Green | G01C 15/008 33/281 |

(Continued)

*Primary Examiner* — Yaritza Guadalupe-McCall
(74) *Attorney, Agent, or Firm* — Peacock Law P.C.; Justin R. Muehlmeyer; Justin R. Jackson

(57) ABSTRACT

Level tools and level indicating devices for determining the angle of a vertically oriented object relative to both level and plumb capable of being read without requiring the tool's user to change his or her position or the position of the level tool.

17 Claims, 17 Drawing Sheets

(56) References Cited

U.S. PATENT DOCUMENTS

| | | | | |
|---|---|---|---|---|
| 5,685,083 | A | * | 11/1997 | Decesare ................ G01C 9/26 33/382 |
| 5,933,974 | A | | 8/1999 | Walters et al. |
| 6,032,376 | A | * | 3/2000 | Shurtleff ................ G01C 9/12 33/371 |
| 6,098,300 | A | * | 8/2000 | Angelucci ............... G01C 9/26 33/379 |
| 6,211,662 | B1 | * | 4/2001 | Bijawat .................. G01V 3/15 324/202 |
| D460,700 | S | | 7/2002 | Marletta |
| 6,731,102 | B2 | * | 5/2004 | Gregorec, Jr. ....... G01R 15/125 324/142 |
| 6,807,743 | B2 | | 10/2004 | Odachowski |
| D500,691 | S | | 1/2005 | Fesmire |
| 6,968,626 | B1 | | 11/2005 | Wondracek |
| 6,968,627 | B1 | * | 11/2005 | McAllester ............. G01C 9/12 33/344 |
| 6,996,911 | B1 | * | 2/2006 | Dinius .................. G01B 3/566 33/371 |
| D544,382 | S | | 6/2007 | Bowers |
| 7,237,341 | B2 | * | 7/2007 | Murray .................. G01C 9/06 33/286 |
| 7,278,223 | B1 | * | 10/2007 | Dever .................... B25H 7/04 33/574 |
| 7,287,336 | B1 | * | 10/2007 | Goodrich ............. G01C 15/008 33/227 |
| 7,690,124 | B1 | * | 4/2010 | Henry .................. G01C 15/004 324/67 |
| 7,743,520 | B1 | * | 6/2010 | Jiorle .................... G01C 9/28 33/366.11 |
| 7,975,395 | B2 | | 7/2011 | Keller et al. |
| D657,274 | S | | 4/2012 | Neethling |
| 8,193,802 | B2 | * | 6/2012 | Jones ..................... F21L 4/027 324/72.5 |
| 8,286,360 | B1 | * | 10/2012 | Murray .................. G01C 9/02 33/347 |
| 2001/0049879 | A1 | * | 12/2001 | Moore, Jr. ........... G01C 15/008 33/376 |
| 2003/0066198 | A1 | * | 4/2003 | Turner ................... G01C 9/28 33/370 |
| 2003/0218469 | A1 | * | 11/2003 | Brazell .................. G01V 3/15 324/637 |
| 2003/0226270 | A1 | * | 12/2003 | Leasure ................ G01C 9/18 33/370 |
| 2004/0040169 | A1 | * | 3/2004 | Davis ................... B23D 59/002 33/640 |
| 2004/0255477 | A1 | * | 12/2004 | Levine ................. G01C 15/004 33/286 |
| 2006/0123645 | A1 | | 6/2006 | Gorgone |
| 2006/0123715 | A1 | | 6/2006 | Gorgone |
| 2006/0265895 | A1 | * | 11/2006 | Daugherty ................ B43L 7/00 33/613 |
| 2006/0277776 | A1 | | 12/2006 | Paul |
| 2007/0107241 | A1 | * | 5/2007 | Sergyeyenko ....... G01C 15/006 33/290 |
| 2007/0180719 | A1 | * | 8/2007 | Donnelly ................ B60S 9/02 33/366.11 |
| 2007/0234483 | A1 | * | 10/2007 | Kunz ...................... B25D 1/00 7/143 |
| 2008/0110038 | A1 | * | 5/2008 | Sergyeyenko ........... G01C 9/26 33/334 |
| 2010/0229410 | A1 | * | 9/2010 | Schubert ................ G01C 9/06 33/366.27 |
| 2011/0284254 | A1 | * | 11/2011 | Moore ................. B23Q 17/007 173/2 |
| 2011/0302796 | A1 | * | 12/2011 | Schubert ................ G01C 9/06 33/366.11 |
| 2012/0324746 | A1 | * | 12/2012 | Hanson ................ G01C 9/14 33/377 |
| 2014/0237833 | A1 | * | 8/2014 | Schubert ................ G01C 9/06 33/365 |
| 2016/0377428 | A1 | * | 12/2016 | Schubert ................ G01C 9/10 33/366.11 |
| 2017/0150834 | A1 | * | 6/2017 | Sergyeyenko ........... A47G 1/24 |
| 2017/0322025 | A1 | * | 11/2017 | Norris .................... G01C 9/12 |

* cited by examiner

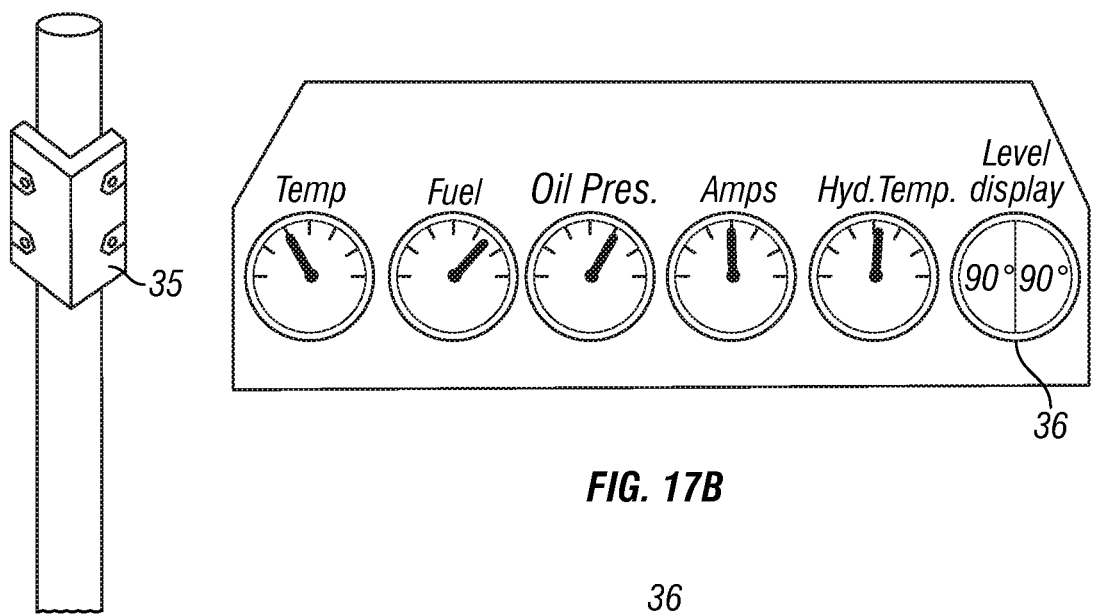
FIG. 17B
FIG. 17A
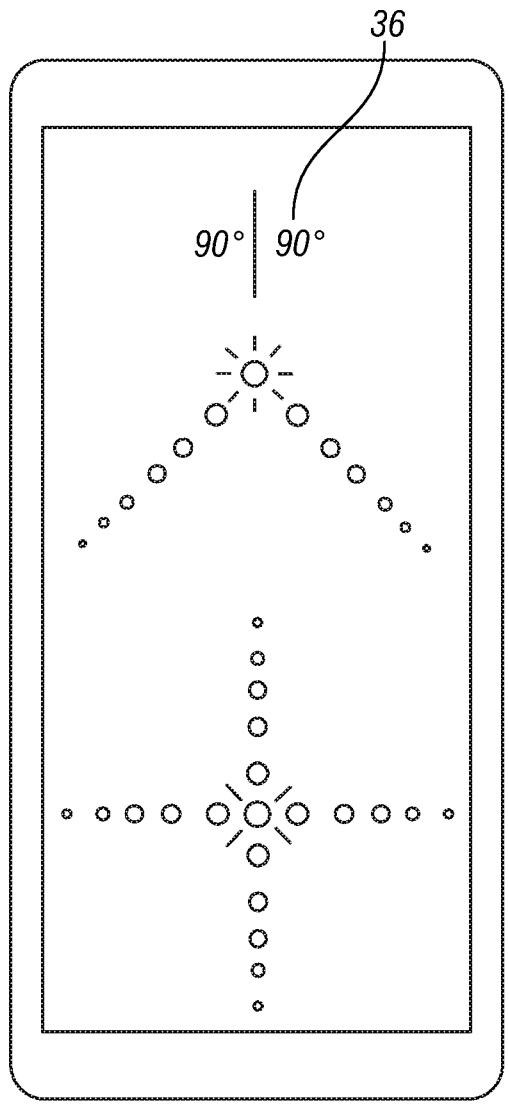
FIG. 17C

MULTI-DIMENSIONAL LEVEL TOOL WITH LEVEL INDICATING DEVICES

CROSS-REFERENCE TO RELATED APPLICATIONS

This application claims priority to and the benefit of the filing of U.S. Provisional Patent Application No. 62/458,137, filed on Feb. 13, 2017, and the specification and figures thereof are incorporated herein by reference.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY INVENTOR

Not Applicable.

COPYRIGHTED MATERIAL

Not Applicable.

BACKGROUND OF THE INVENTION

Field of the Invention (Technical Field)

The present invention relates to apparatuses and methods of measuring whether a given surface is level, plumb, and/or square.

Description of Related Art

A level device has level indicators, ordinarily one type of level indicator being vertical and one type being horizontal relative to a given surface being leveled. The horizontal type indicators measure the angle of the given surface relative to calibrated level. The vertical type indicators, once the level device is rotated 90 degrees, will indicate whether the given surface is plumb. Determining whether a given vertical object is both level and plumb requires that the level device be rotated 90 degrees, and/or placed on a different surface of the object, and/or that the person modify their position to view an obscured indicator. Sometimes, due to the positioning and environment of the surface being measured, it is impossible or highly inconvenient for the user to reposition or rotate the level device or reposition themselves. What is needed is a device and method of measuring whether a given object, for example a vertically oriented object, is level and plumb without having to rotate or modify the position of the level device or the position of the user of the level device.

BRIEF SUMMARY OF THE INVENTION

Embodiments of the present invention provide a level tool comprising level indicator devices for determining the angle of a vertically oriented object relative to both level and plumb capable of being read without requiring the tool's user to change his or her position or the position of the level tool. Embodiments of the level tool comprise level indicating devices comprising disks, wheels, pendulums, liquid-filled containers, and/or electronic displays, and any combination thereof.

Objects, advantages and novel features, and further scope of applicability of the present invention will be set forth in part in the detailed description to follow, and in part will become apparent to those skilled in the art upon examination of the following, or may be learned by practice of the invention.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS. 17A, 17B, and 17C are illustrations of embodiments of remote wire or wireless level indicating devices of the level of the present invention from a front perspective view, FIG. 17A illustrating a level indicating device attached to a pipe, FIG. 17B illustrating a level indicating device receiving data from remote level of the present invention, and FIG. 17C illustrating a smart phone level indicating device.

DETAILED DESCRIPTION OF THE INVENTION

Referring to the figures, a level 10 of the present invention comprises a frame having at least one leg. Preferably, the frame comprises two legs 12 and 14 that join together at a substantially ninety-degree angle, giving the level 10 an L-shaped structure, so that a level indicator device 20 may be embedded in each of the legs 12 and 14 to indicate the angle of more than one dimension (both level and plumb) while permitting level 10 to act also as a square and/or to permit level 10 to be supported on surfaces that are flat and/or have edges. However, legs 12 and 14 may join together at other angles, or be formed as part of a continuous shape, to accommodate certain surfaces and be of any dimensions appropriate for the particular application.

In a preferred embodiment, the frame of level 10 is formed of any rigid material or combination of materials with non-magnetic properties, for example plastic. In this way, the frame's orientation is unaffected by magnetic fields nor can it affect any material in a level indicating device 20. However, some embodiments may be formed of any rigid material, including but not limited to metal, wood, etc., and may comprise magnets placed on or in any surface or part of level 10 for removably attaching level 10 to other objects with magnetic properties.

Figure 5:
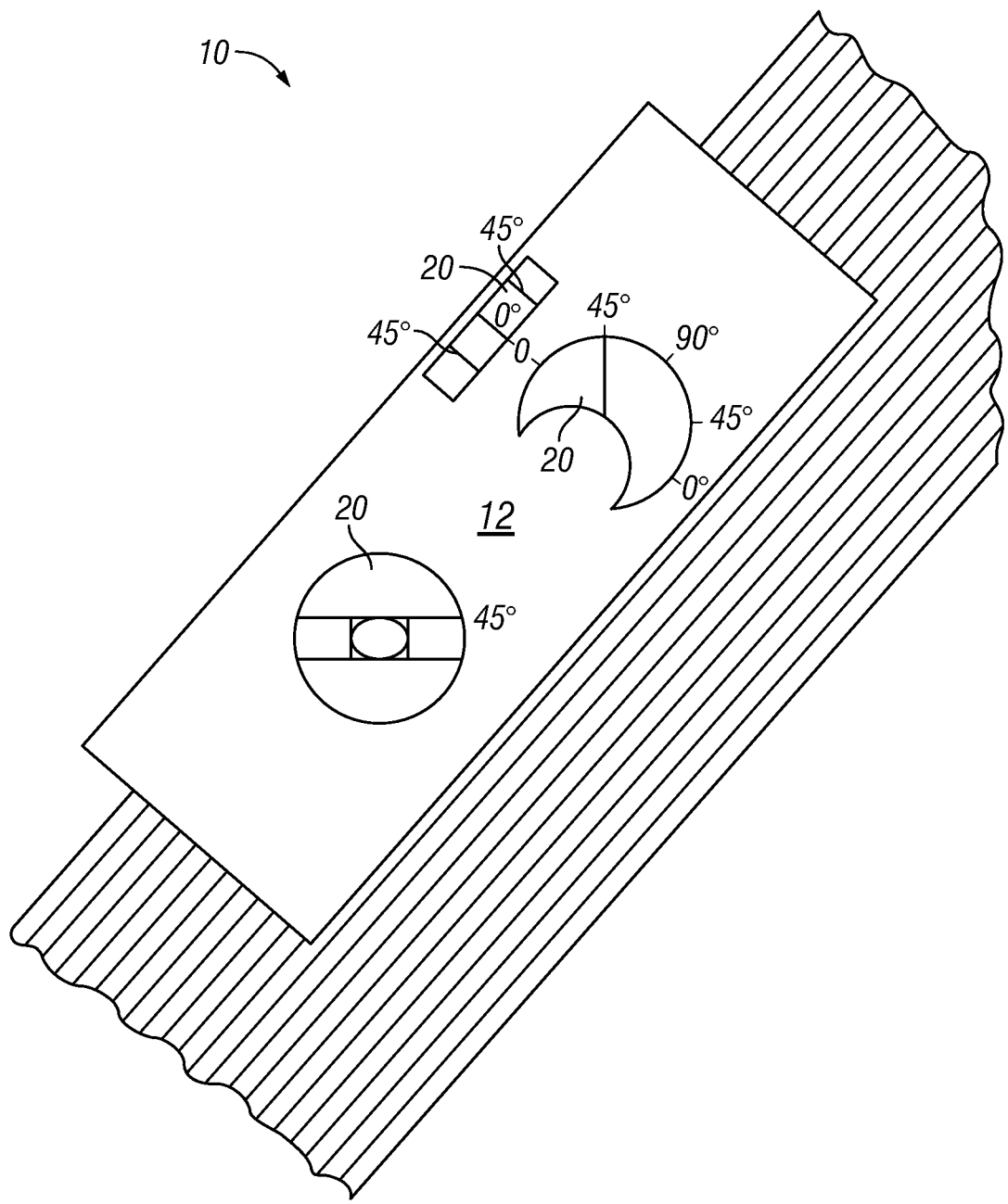
FIG. 5 is an illustration of an embodiment of the level of the present invention with several level indicating devices in use with a given surface at 45 degrees in one axis and zero degrees in the other axis as indicated on the level's front.
Figure 6:
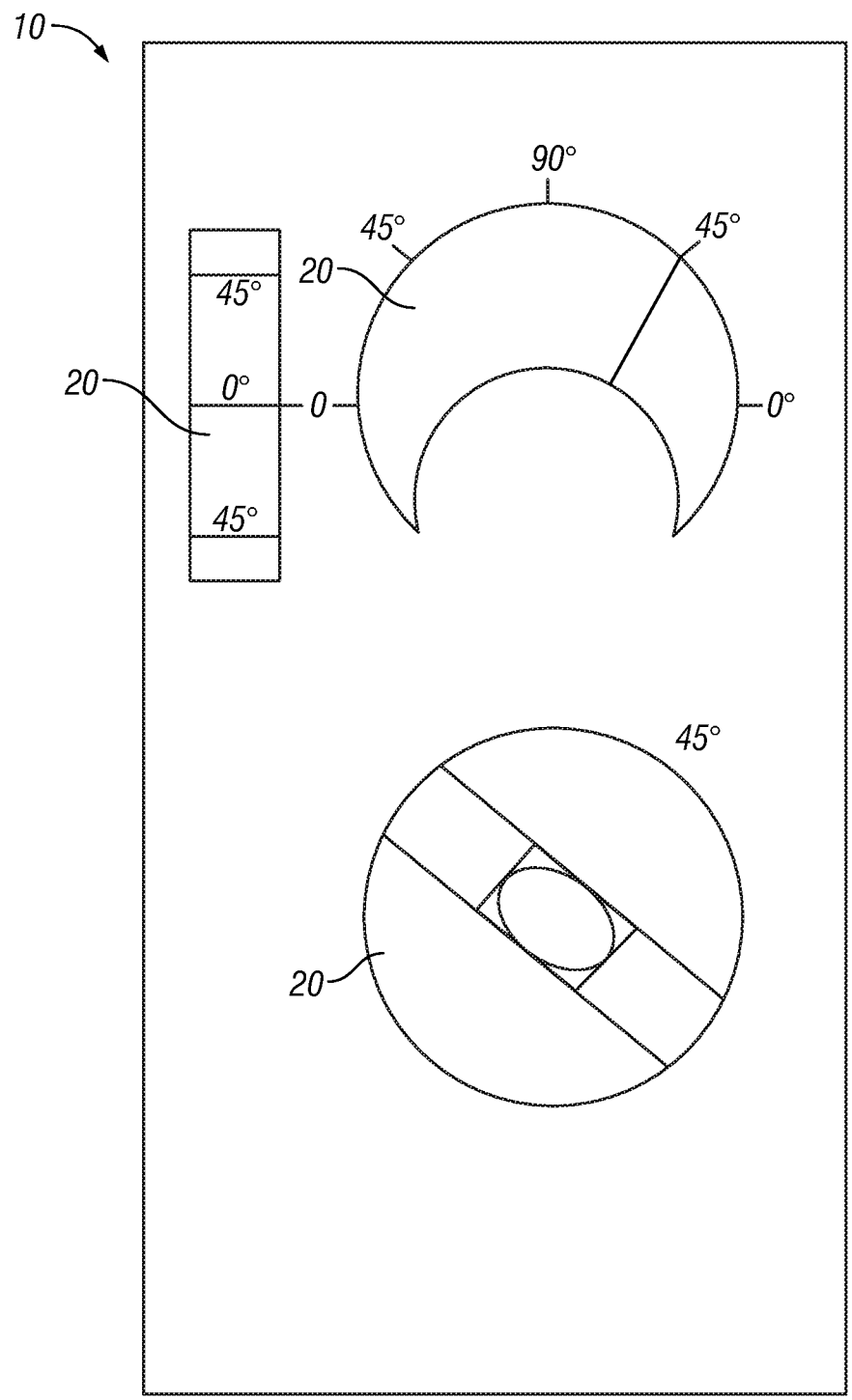
FIG. 6 is an illustration of an embodiment of the level of the present invention with several level indicating devices indicating 45 degrees in one axis and zero degrees in the other axis as indicated on the level's front.
Figure 7A:
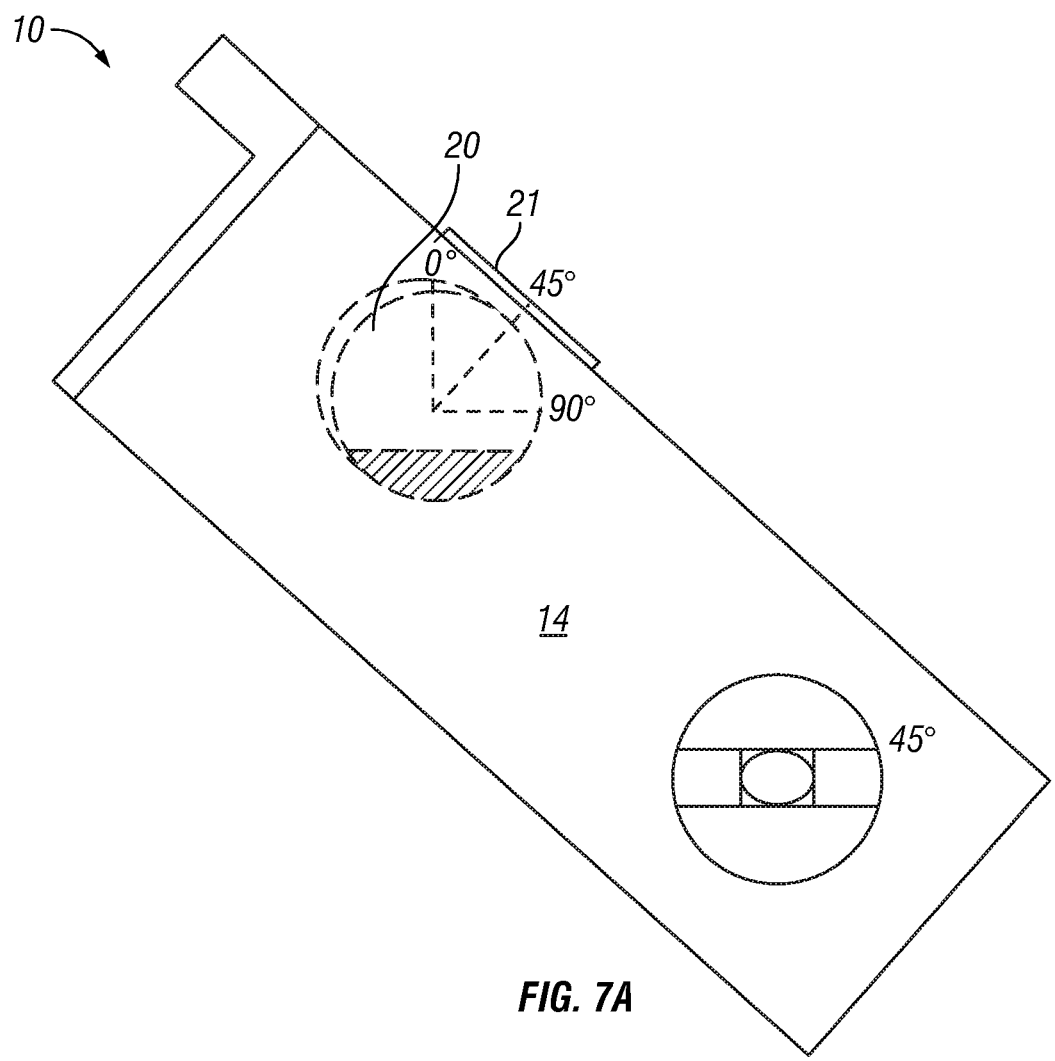
FIGS. 7A and 7B are illustrations of an embodiment of the level of the present invention with two level indicating devices indicating 90 degrees in one axis and 45 degrees in the other axis from a side perspective view and front view, respectively.
Figure 7B:
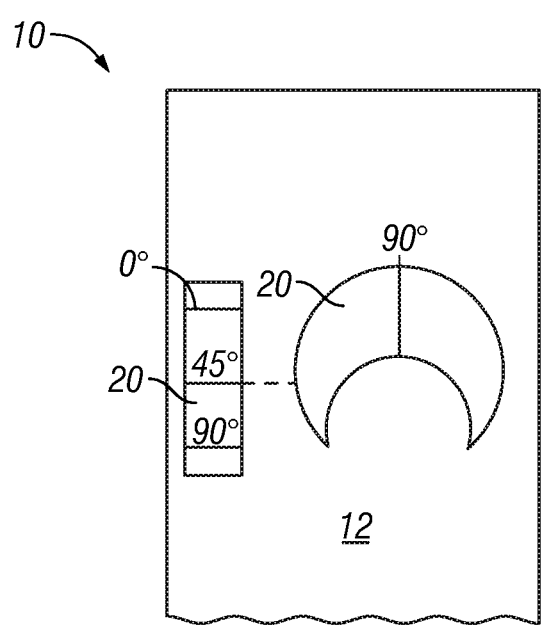

Embodiments of level 10 of the present invention comprise at least one level indicating device 20 for maintaining an orientation calibrated to level by which the angle of level 10 can be measured. Level 10 may comprise any number of level indicating devices 20 and any combination of types of level indicating devices 20, for example, as illustrated in FIG. 5, a level 10 may comprise a bubble-type level indicating device 20 along with other types of level indicating devices 20.

In a preferred embodiment, level 10 indicates the angle of the level 10 in relation to level and plumb such that the level indicators 20 are visible on level 10 on at least a single surface of level 10. In this way, the user of the level can read the level indicators for more than one dimension from a single perspective without having to re-position the level itself or to substantially alter his or her body position. Preferably, level 10 comprises at least one level indicating device 20 attached to or embedded within leg 14 to indicate the angle of a first axis relative to level and at least one other attached to or embedded within leg 12 to indicate the angle of a second axis relative to level, both of which are readable from a single side, face, or surface of level 10. Embodiments of the present invention may employ any number of level indicating devices 20, embedded in any part or surface of level 10, with any orientation.

Figure 3:
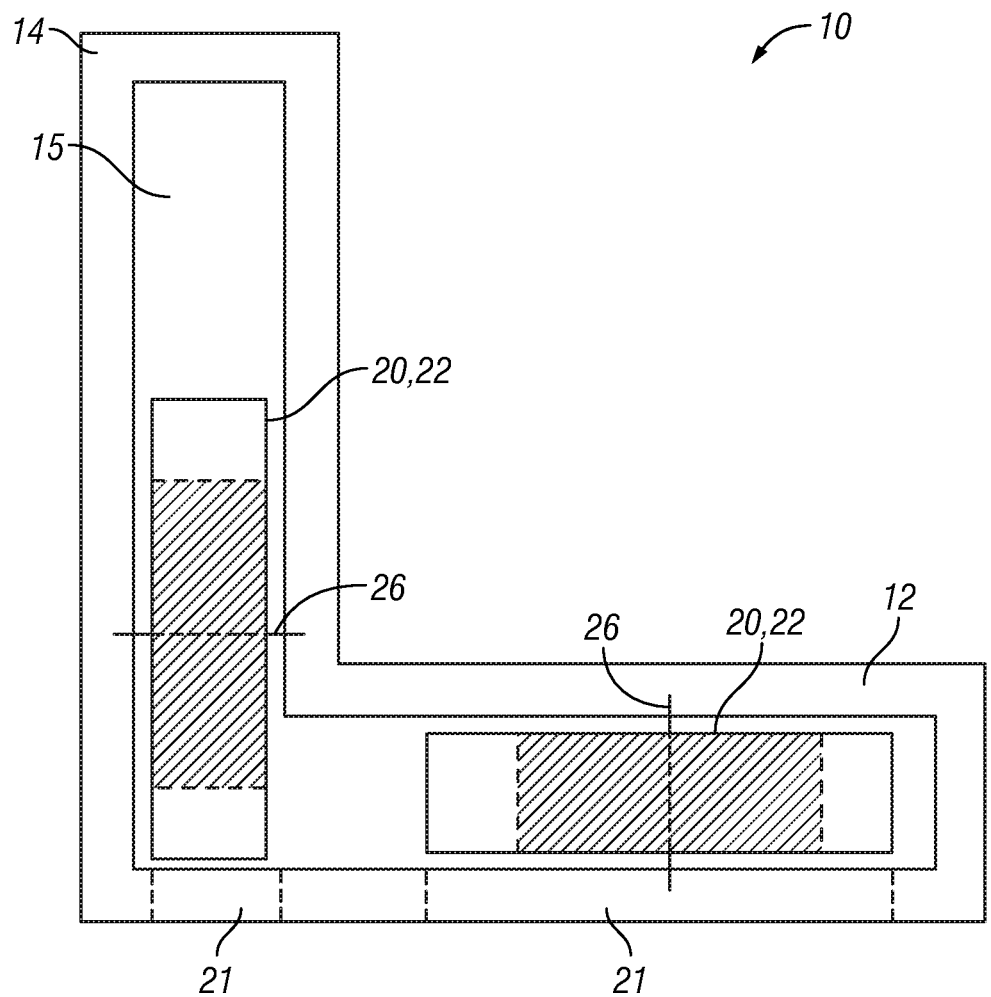
FIG. 3 is a cross-sectional illustration of an embodiment of the level of the present invention from above looking down.

Preferably, a level indicating device 20 having moving parts is enclosed in a transparent liquid filled container 15 embedded within the frame of level 10, the liquid of which (sometimes called "spirit") is of a viscosity and surface tension that will allow a quick and accurate indication of the level, for example, alcohols such as ethanol. In one example illustrated in FIG. 3, two level indicator devices 20 are suspended in liquid-filled container 15 by pins 26 that attach each indicator device 20 to the frame of level 10 while allowing disks 22 to rotate independent of the frame. In another example illustrated in FIGS. 8-10, two level indicator devices 20 having pendulums 25 are suspended in liquid-filled container 15 by pins 26 that attach each indicator device 20 to the frame of level 10 while allowing pendulums 25 to rotate independent of the frame. In some embodiments of level 10, container 15 contains more than one level indicating device, or level 10 comprises more than one container 15. Container 15 may be of any shape capable of containing a level indicating device 20 within the frame of level 10 and may be embedded within any side, surface, leg, or part of level 10. Some embodiments of level 10 do not comprise a liquid-filled container 15.

Embodiments of level 10 of the present invention comprise level indicating device 20 comprising a disk 22, weight 24, pin 26, and level markings 28, for example as illustrated in FIGS. 1-7. As level 10 rotates in any given axis, level indicating device 20 maintains the same orientation relative to gravity because weight 24 keeps its bottom oriented towards the direction of gravity, and a user viewing level indicating devices 20 through the windows 21 can see markings 28 on level indicating devices 20 and read level markings 28 relative to frame markings 29 to determine the orientation of level 10 relative to level.

In order to permit level indicating device 20 to orient itself independent of the frame of level 10, embodiments of the present invention comprise pin bearings or bushings 26 ("pin"). Preferably, a pin 26 is attached to level indicating device 20 such that pin 26 is immovably attached to the level indicating device 20, for example, glued, melded, welded, sealed, or fastened to level indicating device 20 at its center of rotation, and pin 26 is attached at both of its ends to bearings or bushings embedded within the frame of level 10 on both sides of level indicating device 20. In this way, level indicator device 20 and pin 26 rotate together within the bearings or bushings of the frame of level 10. In some embodiments, pin 26 is immovably attached not to the level indicating device 20, but to the frame of level 10, for example, where level indicating device 20 orients itself independent of the pin 26 by use of a bearing or bushing on pin 26 or by virtue of the shape of level indicating device 20. Preferably, pin 26 passes entirely through level indicating device 20 such that pin 26 can attach to the frame of level 10 on both sides of level indicating device 20. However, in some embodiments, pin 26 does not pass all the way through level indicating device 20, for example, where level indicating device 20 is attached to or supported by pin 26 on one end of pin 26. In some embodiments, pin 26 may also pass through other objects, for example container 15.

Figure 2A:
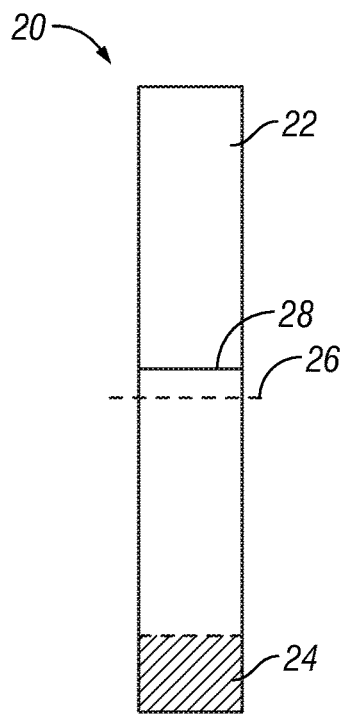
FIGS. 2A and 2B are illustrations of an embodiment of a level indicating device of the level of the present invention from a side view and front view, respectively.
Figure 2B:
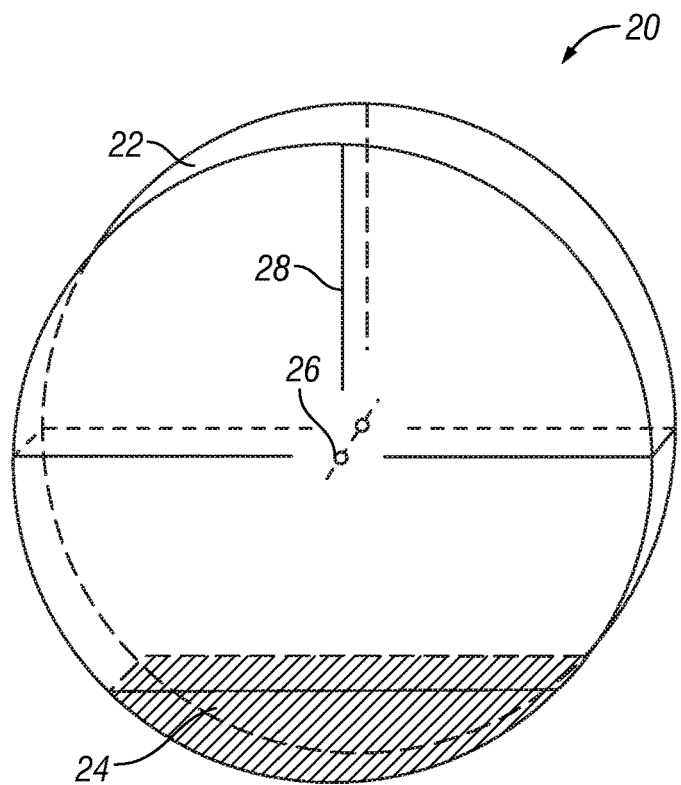
Figure 4:
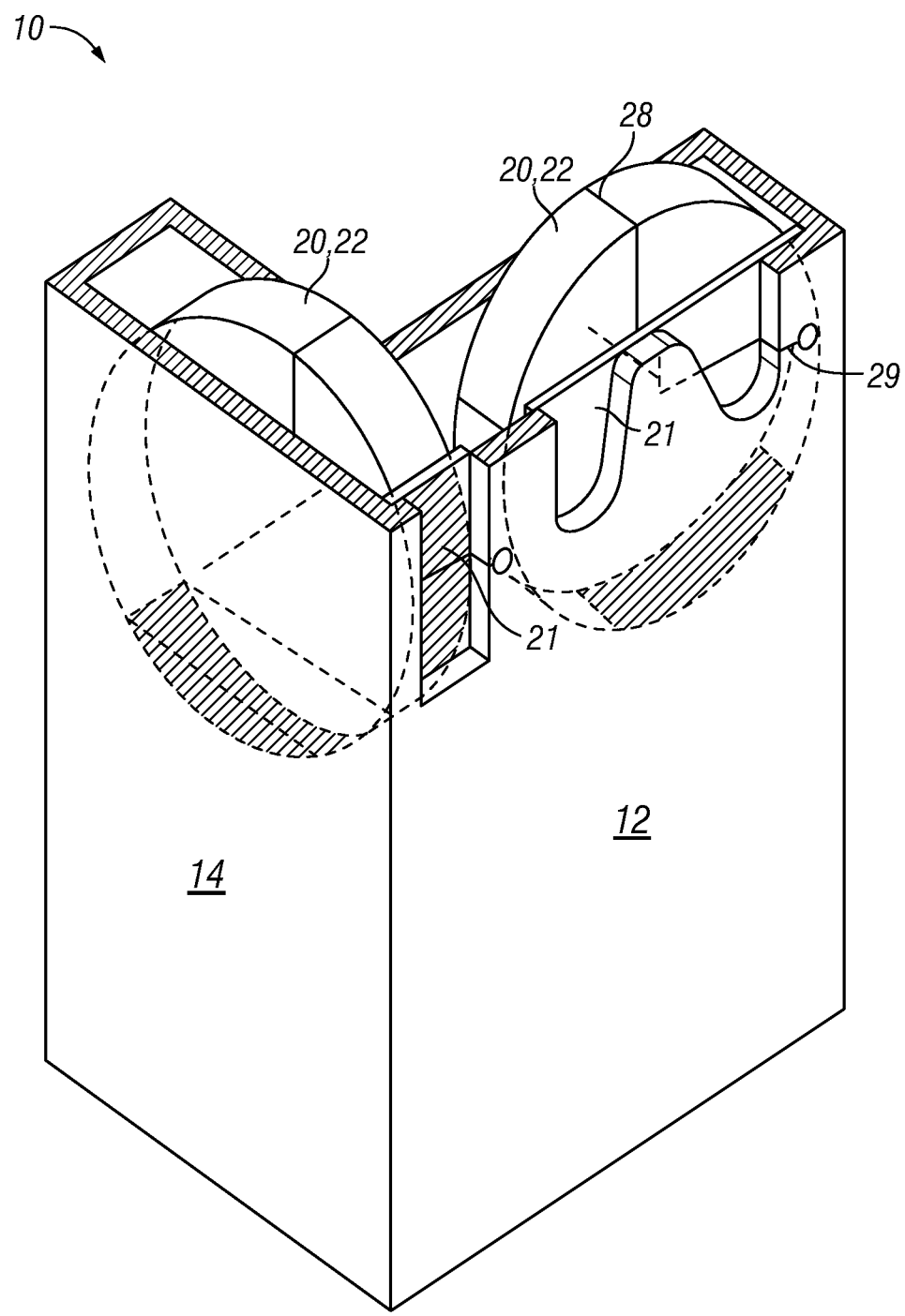
FIG. 4 is a cut-away illustration of an embodiment of the level of the present invention with two level indicating devices from a perspective view.

Preferably, weight 24 comprises a solid material that is permanently held in the bottom of level indicating device 20 with sufficient mass to substantially maintain level indicating device 20's orientation relative to level, for example, lead, brass, etc., of a material which does not evaporate, change form, or expand, and of any shape or size that does not interfere with the function of level indicating device 20. As illustrated in FIGS. 2B and 4, weight 24 is lead bonded to the bottom-most part of level indicating device 20. As illustrated in FIGS. 8-13, weight 24 may take the form of a pendulum 25. In some embodiments, weight 24 may be material attached to or embedded within a part of level indicating device 20, for example lead balls attached to or embedded within pendulum 25. Weight 24 comprises any material that flows by gravity to the bottom of disk 22 with sufficient mass to substantially maintain disk 22's orientation relative to gravity, for example, lead balls.

Preferably, level markings 28 are marked on the outer surface of level indicating device 20, for example on disk 22, calibrated in relation to level. In this way, level can be read relative to the frame of level 10. Preferably, the zero, 45, and 90 degrees of angle relative to level are marked by numbers printed on the level indicating device 20 itself. Embodiments of the present invention may comprise level markings 28 having any manner or type of markings to mark any degree of angle, for example by points, solid lines, dotted lines, dots, circles, numbers, symbols, words, etc., and placed on the level indicating device 20 by any manner, including printing, gluing, melding, embedding, etching, writing, etc.

Preferably, the frame of level 10 itself is marked with frame markings 29, at or near windows 21 calibrated to the orientation of the frame of level 10. Preferably, zero degrees and ninety degrees are indicated by a solid line along window 21. Embodiments of the present invention may comprise frame markings 29 having any manner or type of markings to mark any degree of angle, for example by points, solid lines, dotted lines, dots, circles, numbers, symbols, words, etc., and placed on the frame of level 10 by any manner, including printing, gluing, melding, embedding, etching, writing, etc.

Figure 1:
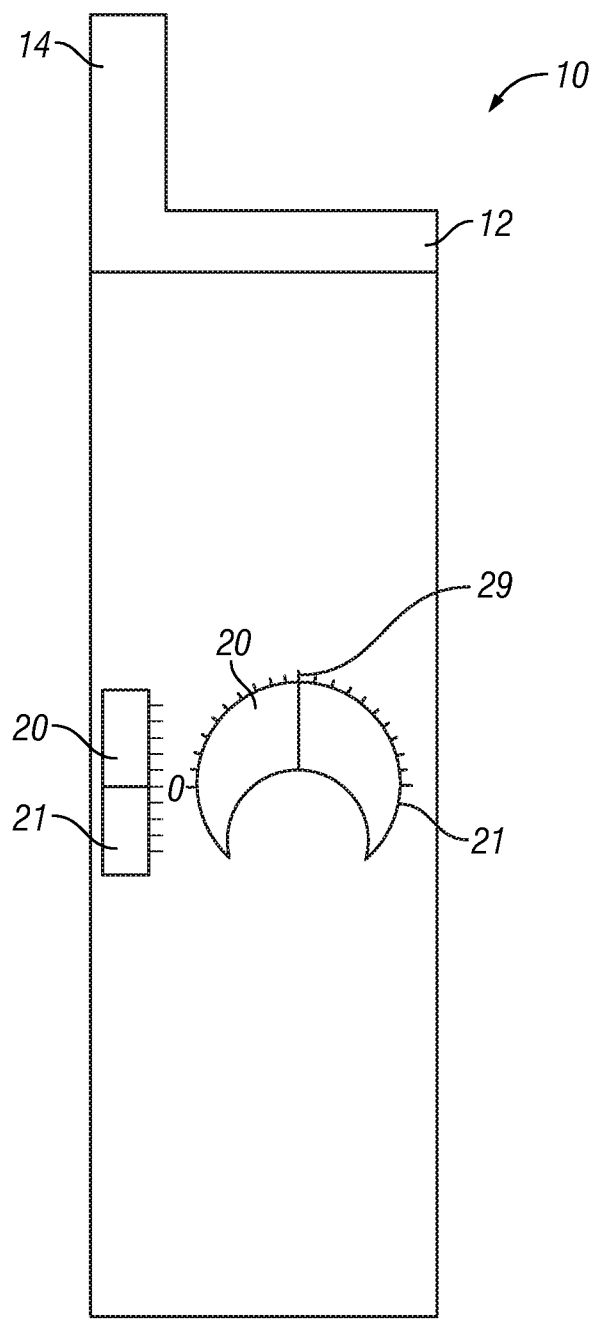
FIG. 1 is an illustration of an embodiment of the level of the present invention with two level indicating devices on its front from a front perspective view.

Preferably, the frame of level 10 comprises windows 21 that allow a user of the level 10 to view a level indicating device 20. As best seen in FIGS. 1 and 4, there are two windows 21, one for each of the two level indicating devices 20. Because the level indicating device 20 for measuring a first axis is embedded within leg 14, the window needed to see it is of a rectangular shape the length of which extends along a substantial length of the disk 22's diameter. In contrast, the window 21 for viewing the level indicating device 20 embedded within leg 12 is of a circular shape allowing the user to see a substantial amount of its circular face. The shapes of windows 21 may be of any shape allowing the viewer to see a substantial amount of markings 28 on a level indicating device 20. In some embodiments, for example the embodiments illustrated in FIGS. 8-13, more than one level indicating device 20 may be viewed from a single window. Preferably, each window 21 comprises a transparent material to protect the level indicating device 20, for example, a window formed of clear plastic. However, in some embodiments, window 21 may be an empty opening, particularly in embodiments of level 10 comprising a container 15 that already protects level indicating devices 20. Embodiments of the level 10 of the present invention may comprise any number of windows on any surface or face of the level. In some embodiments, windows 21 may permit a user to view a level indicating device 20 from both sides of a leg 12 or 14.

Referring to embodiments illustrated in FIGS. 8-13, a level indicating device 20 comprises a pendulum 25, pin 26, and pointer 27. As level 10 rotates in any given axis, level indicating device 20 maintains the same orientation relative to level because pendulum 25 keeps pointer 27 oriented such that it points along the direction of the force of gravity, and a user viewing pointer 27 through the windows 21 can see whether pointer 27 is aligned with frame markings 29 to determine the orientation of level 10 relative to level.

Preferably pointer 27 is calibrated either to point at zero degrees or 90 degrees relative to level, and of a narrow shape that narrows even more as you approach its tip. In this way, the pointer can be read to an accurate degree. However, pointer 27 may take any shape that is capable of indicating any angle.

Figure 11A:
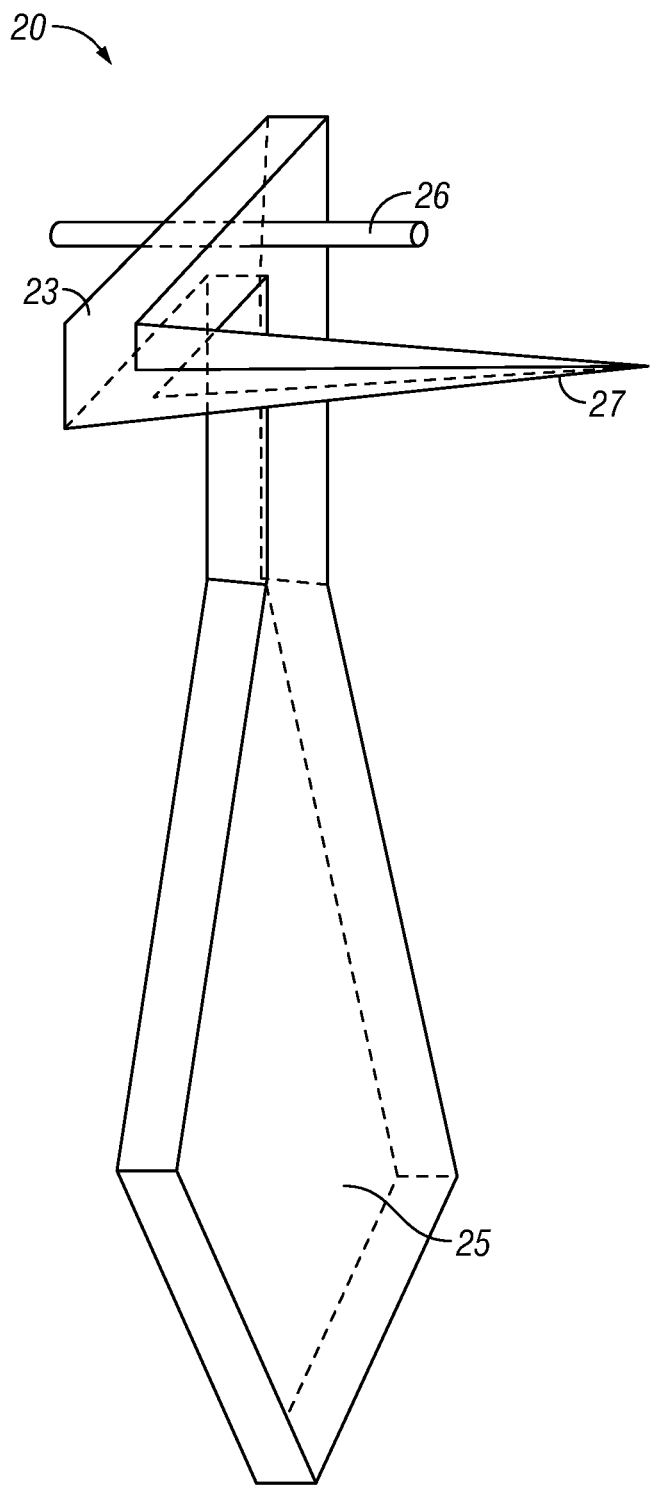
FIGS. 11A and 11B are illustrations of embodiments of level indicating devices of the level of the present invention from a front view, FIG. 11A illustrating a level indicating device having an extension arm.
Figure 11B:
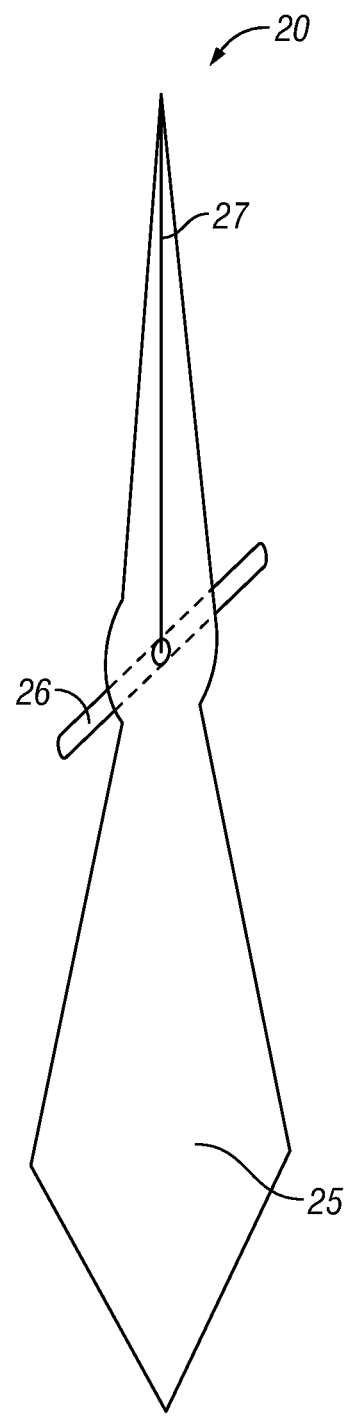
Figure 12:
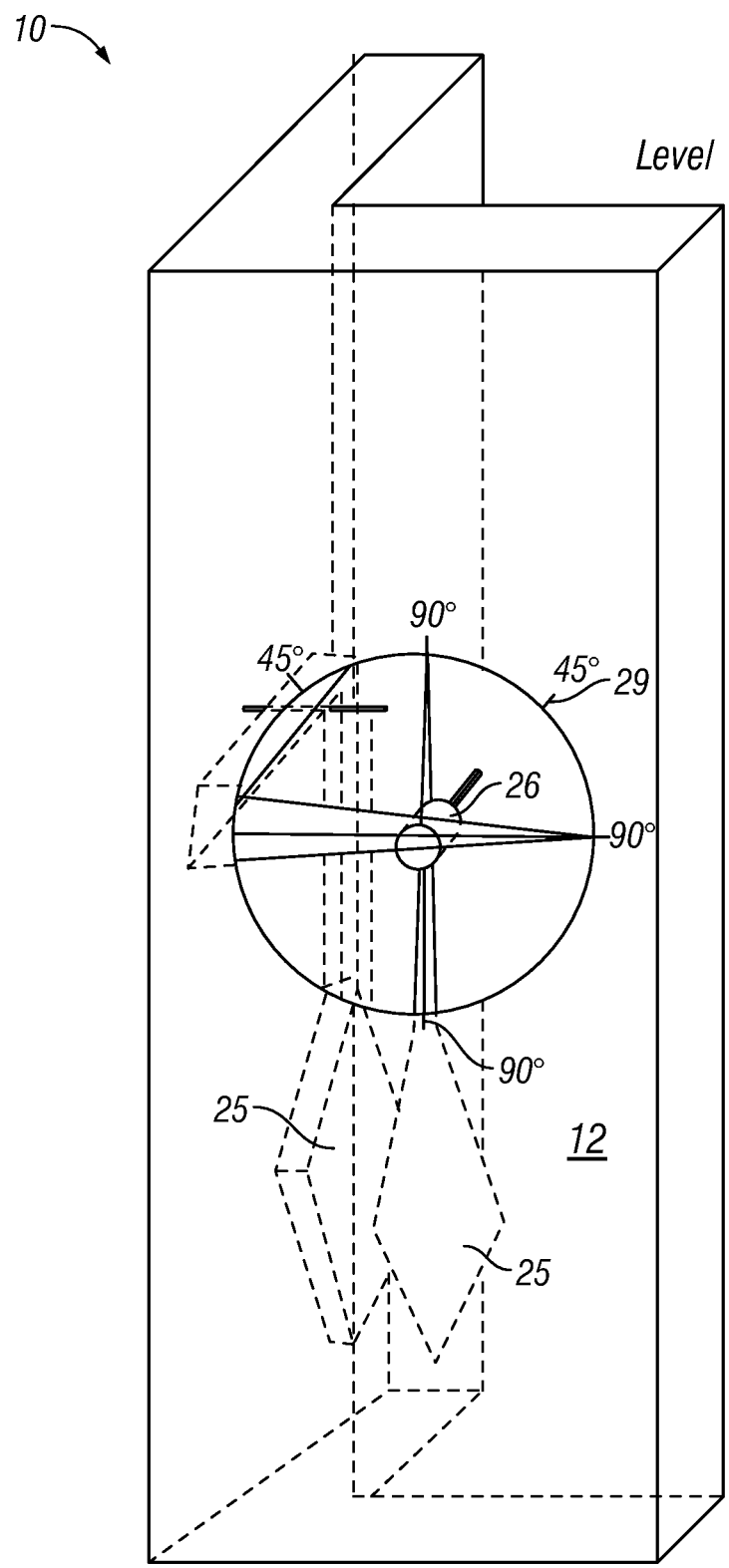
FIG. 12 is an illustration of an embodiment of the level of the present invention with two level indicating devices indicating a perfectly plumb surface at 90 degrees in one axis and 90 degrees in the other axis from a front perspective view.
Figure 13:
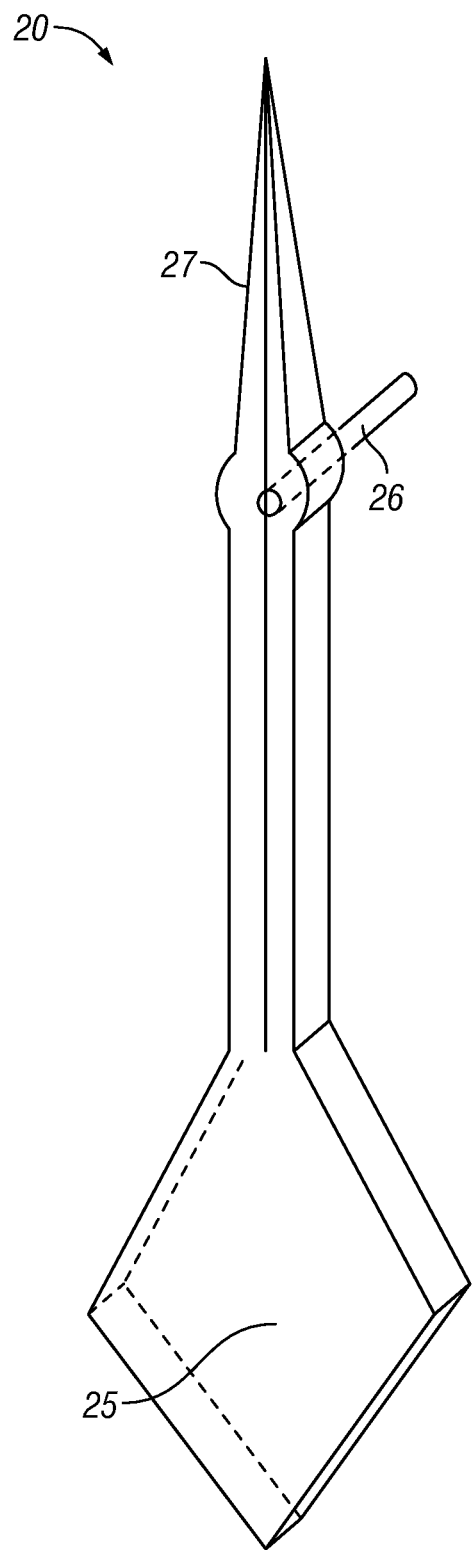
FIG. 13 is an illustration of an embodiment of a level indicating device of the level of the present invention from a front view.

Preferably, pendulum 25 is weighted with or formed of a material with sufficient mass to substantially maintain pointer 27's orientation relative to level, and which is non-magnetic so its orientation is not altered by magnetic fields, for example, lead. Preferably, pendulum 25 and pointer 27 are formed of the same continuous material and the shape of the pendulum is such that it has a larger volume of the material at its end closest to the ground so that most of the level indicating device's weight is at its bottom, for example, as best seen in FIGS. 11A and 11B, a kite or diamond shape at its bottom. However, embodiments of the pendulum 25 may be of any shape as long as it substantially orients pointer 27 relative to gravity, and pendulum 25 and pointer 27 may be formed of any materials and different materials than each other.

Figure 8:
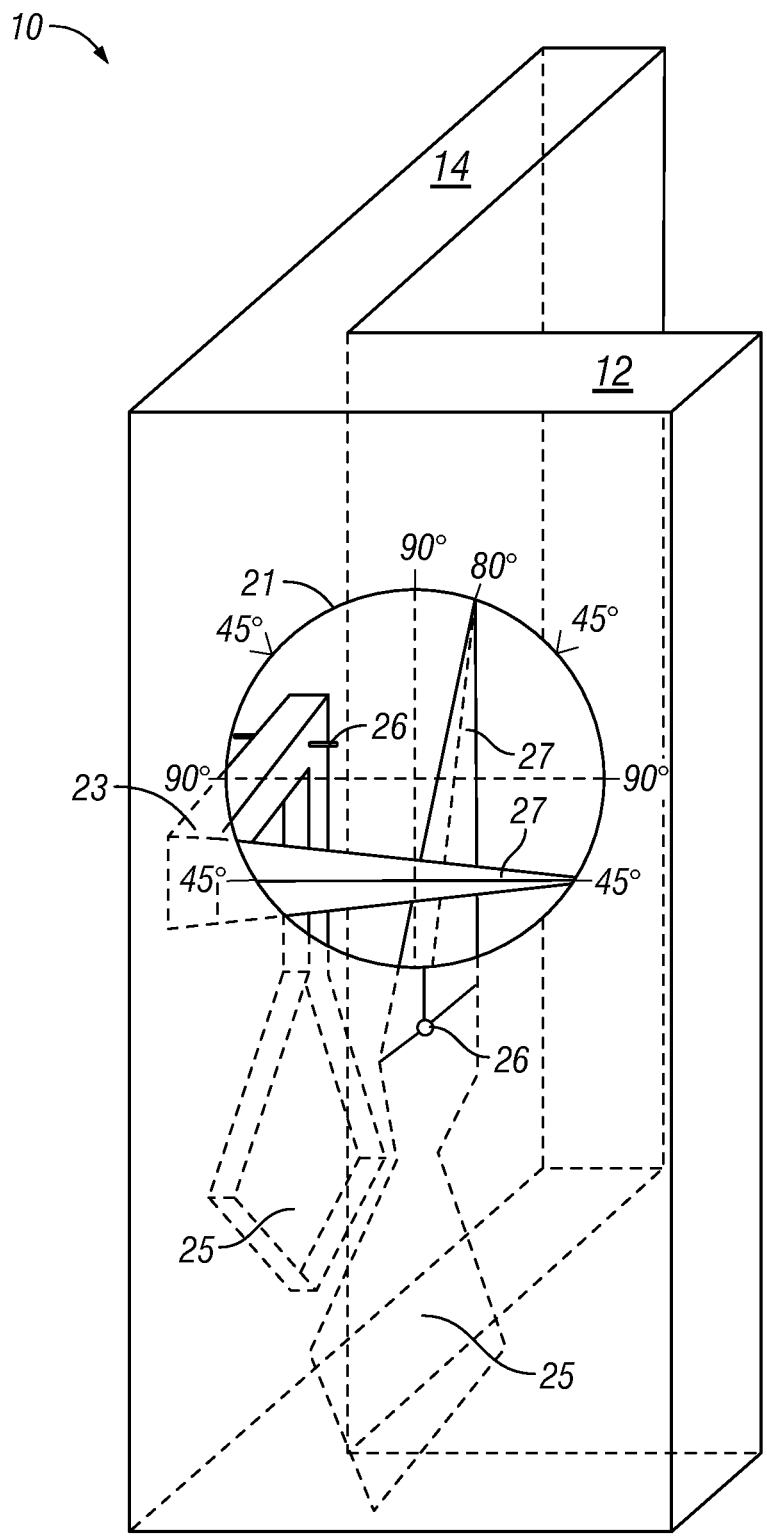
FIG. 8 is an illustration of an embodiment of the level of the present invention with two level indicating devices indicating 45 degrees in one axis and 80 degrees in the other axis from a front perspective view.
Figure 9:
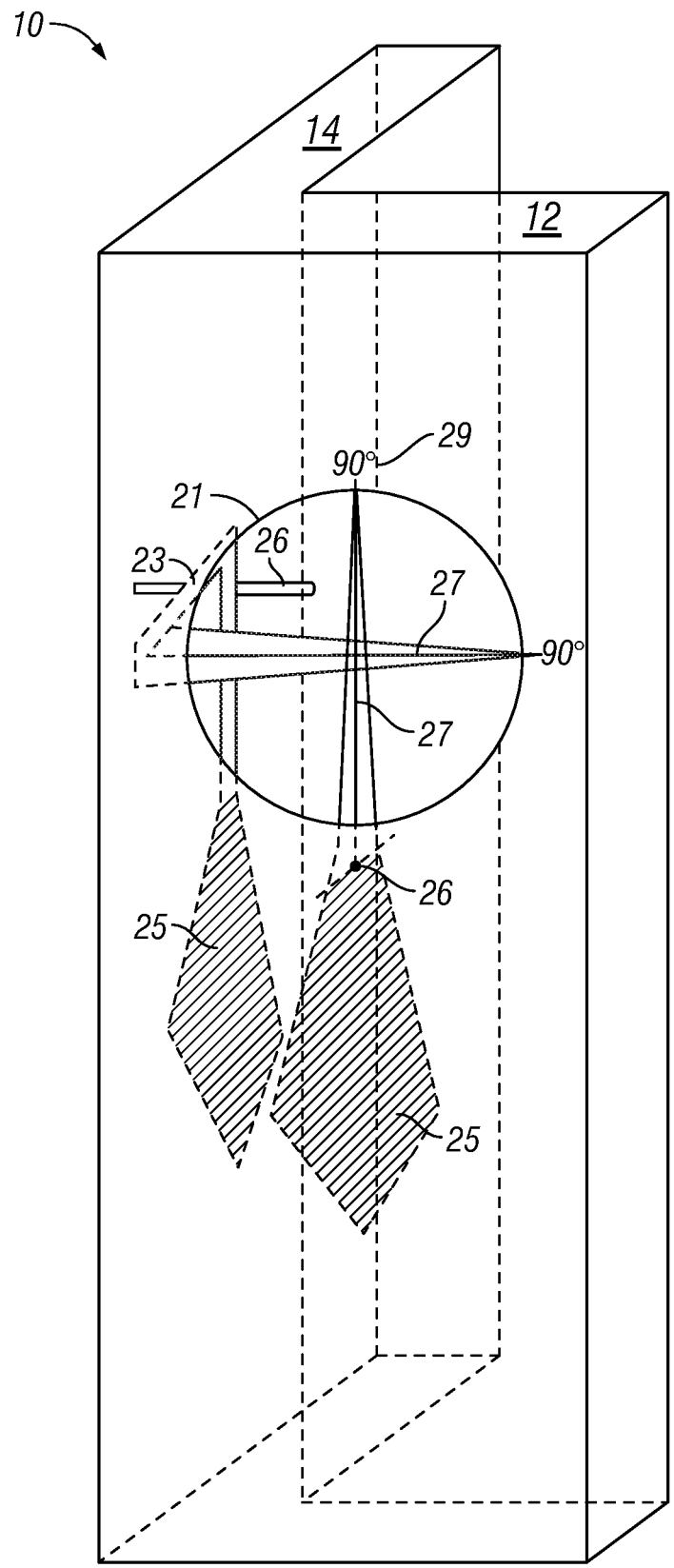
FIG. 9 is an illustration of an embodiment of the level of the present invention with two level indicating devices indicating a perfectly plumb surface at 90 degrees in one axis and 90 degrees in the other axis from a front perspective view.
Figure 10:
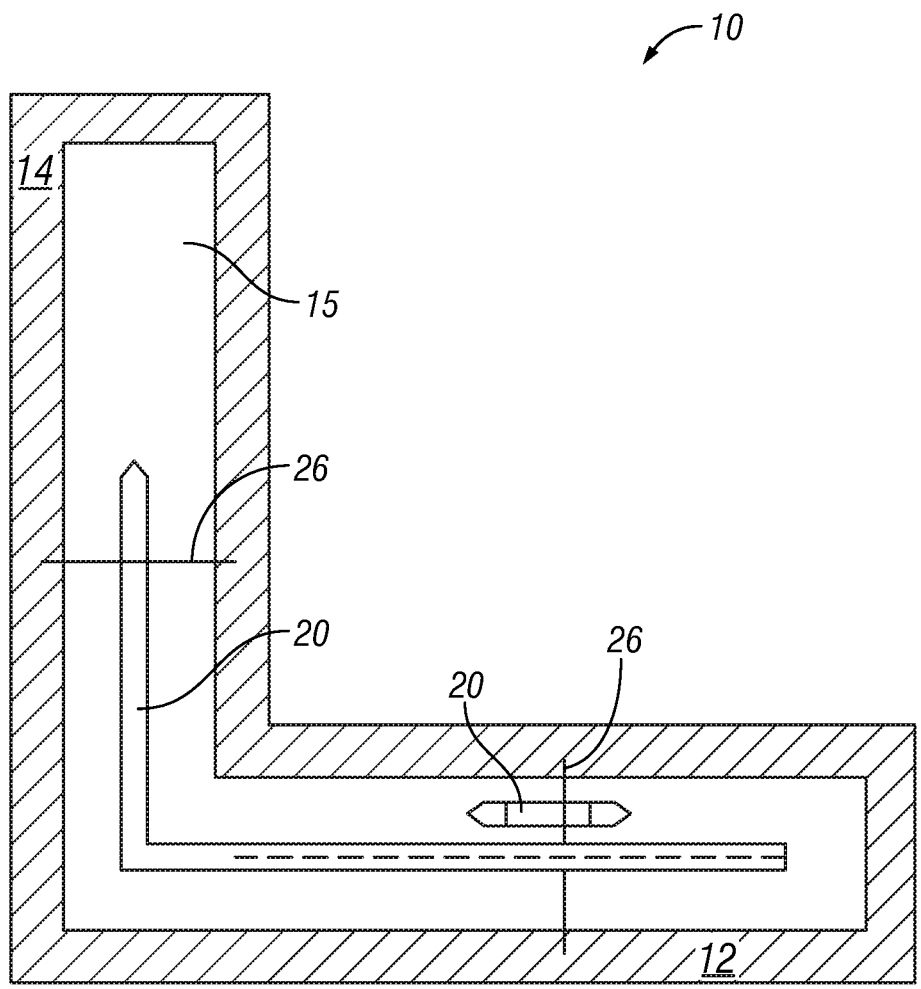
FIG. 10 is a cross-sectional illustration of an embodiment of the level of the present invention from above looking down.

In the embodiments illustrated in FIGS. 8-13, two level indicating devices 20 each having a pendulum 25 are visible through a window 21 on a single face of level 10, for example, the front face of leg 12. In such embodiments, the pin 26 of one of the level indicating devices 20 is embedded in the leg that does not have the window, for example in leg 14. In order for the pointer 27 of the level indicator device 20 embedded within the leg not having the window to be viewable in a window 21 of the other leg, an extension arm 23 preferably extends the pointer 27 in a perpendicular direction to the axis of the pendulum 25, as illustrated in FIGS. 8-10. The extension arm 23 in the embodiments illustrated preferably has an elbow-shaped bend, that is, the shape comprises an arm at a perpendicular angle to the axis of the pendulum 25 and then the pointer extending at a perpendicular angle to that to extend into leg 12. To prevent the two pointers 27 of the two level indicating devices 20 from interfering with each other, preferably the pins 26 of the two level indicating devices 20 are at different heights on the level 10, as best illustrated in FIG. 10. In this way, the two pointers 27 of the two level indicating devices 20 each having its own pendulum 25 can be read to determine the level 10's orientation relative to level in two different axes.

Figure 14:
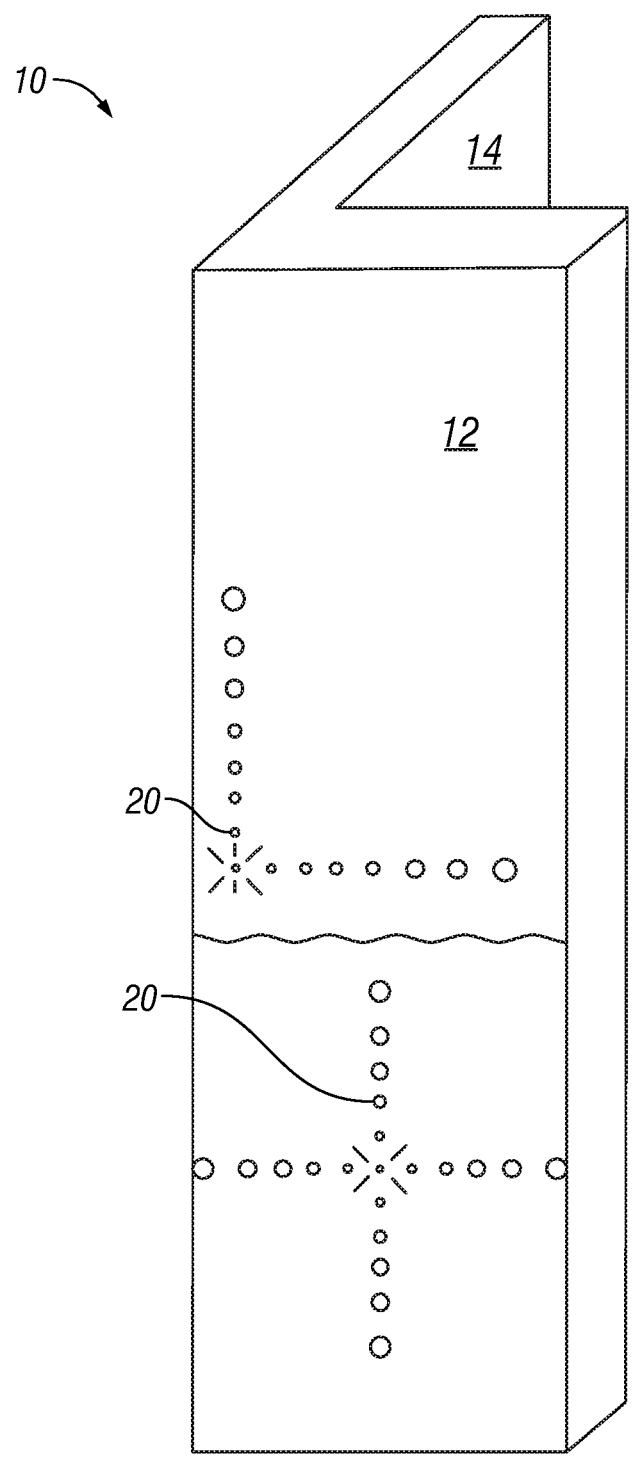
FIG. 14 is an illustration of an embodiment of the level of the present invention with electronic level indicating devices on its front from a front perspective view.
Figure 16:
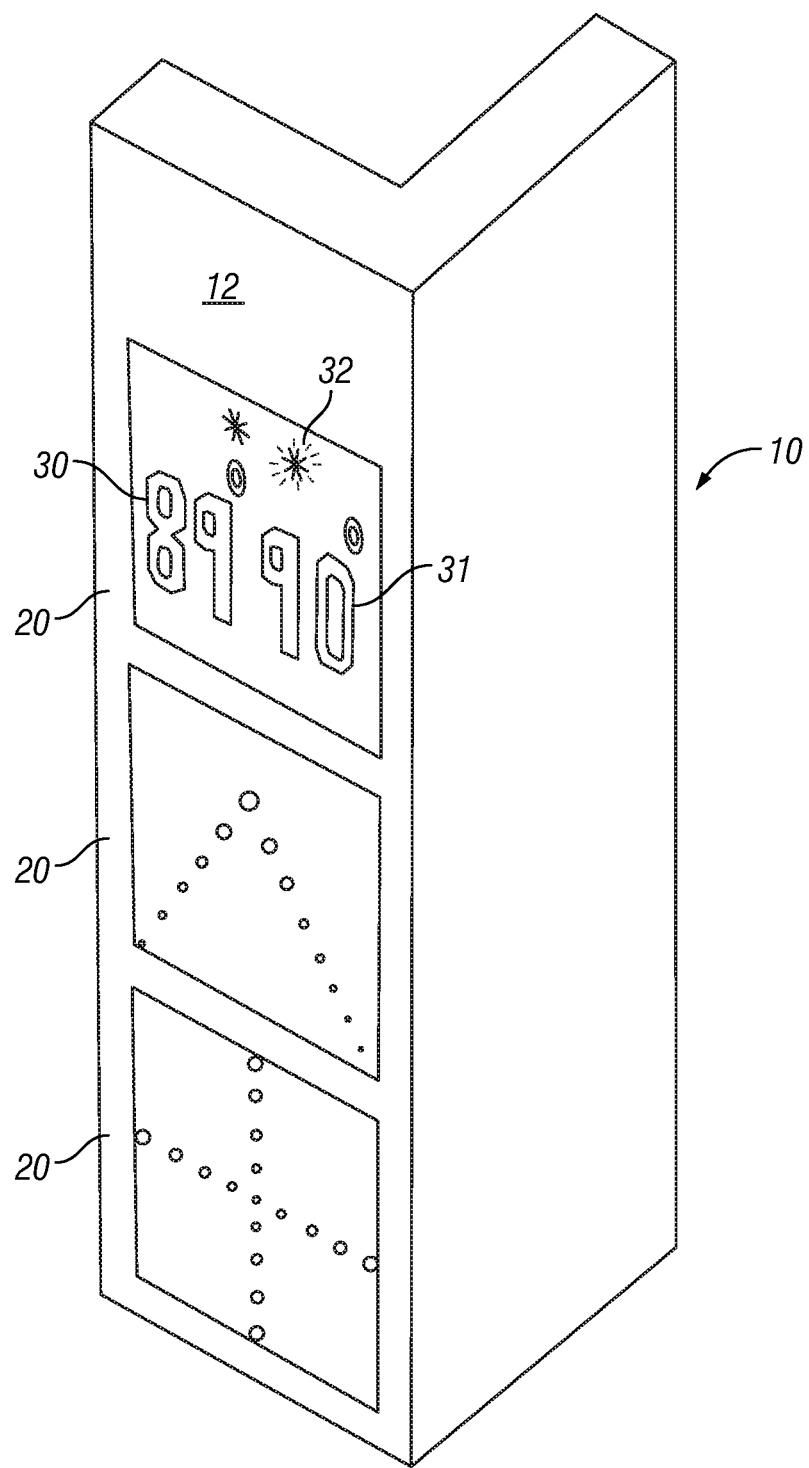
FIG. 16 is an illustration of an embodiment of the level of the present invention with different embodiments of electronic level indicating devices from a perspective view.

Embodiments of the level 10 of the present invention comprise electronic level indicating devices. As illustrated in FIG. 14, at least two level indicating devices 20 indicate the orientation of a first and second axis relative to level, both of which are readable from a single side, face, or surface of level 10. Preferably, each level indicator device comprises an array of lights, for example LEDs, the lights being arranged in distinct patterns for the particular level indicating device 20. For example, it is preferable to have a cross hair pattern for a level indicating device 20 because a cross hair has four rows of lights intersecting at a single light in the middle, the middle light indicating that the leg 12 is perfectly level at all angles. Other arrangements of lights may be used, for example, an L-shaped array because an L-shaped array has two rows of lights, the light at the junction of its two rows marking that leg 14 is level. As illustrated in FIG. 16, embodiments of the level 10 of the present invention may also comprise an electronic level indicating device 20 displaying digital numbers, one number 30 indicating plumb and the other number 31 indicating level, both of which are readable from a single side, face, or surface of level 10. Preferably, each level indicating device 20 comprises the digital display number 31 and a light 32 in the corner, the light indicating that the leg 12 is perfectly level at all angles.

Figure 15:
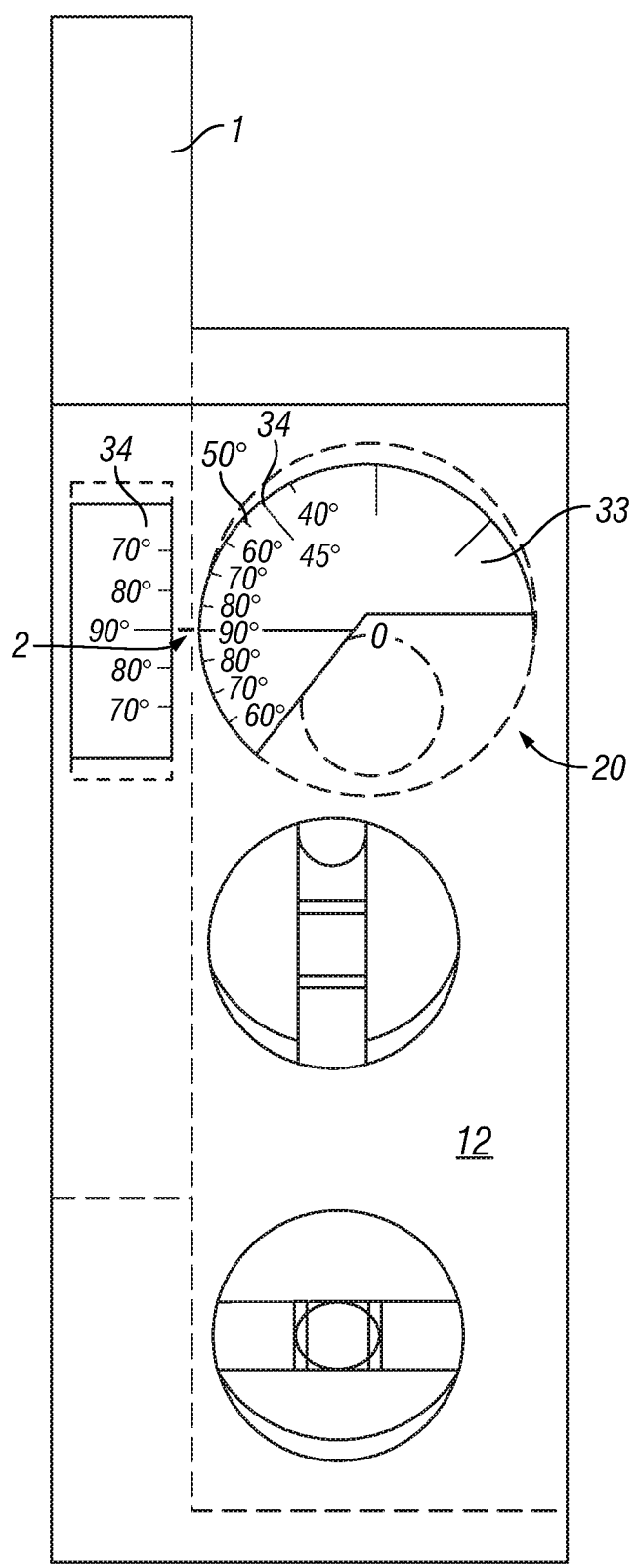
FIG. 15 is an illustration of an embodiment of the level of the present invention with a weighted disc or plate level from a front perspective view.

Referring to the embodiment illustrated in FIG. 15, a level indicating device 20 comprises a weighted wheel, disc, or plate 33. Degrees of angle 34 are aligned on wheels, disc, or plate 33, such that when level 10 is perfectly plumb and level, the wheels 33 align with the frame, allowing the user to focus on only one location on level 10. This embodiment may have spirit levels that allow the level 10 to be used on any horizontal or vertical object. This embodiment may also have magnets to hold level on pipes, beams, or any metal item. Level may also have straps to hold it on to any wood or plastic item.

Referring to the embodiment illustrated in FIG. 17, a level indicating device 20 comprises a remote device 35 that may be secured to an object that needs to have both planes of level read. Preferably, each level indicating device 20 will have a wire or wireless remote display 36 that communicates with the particular level indicating device. For example, a smart phone app may be used to communicate via Bluetooth to the level 10 in order to remotely display the electronic level indicating device.

Although the invention has been described in detail with particular reference to these embodiments, other embodiments can achieve the same results. Variations and modifications of the present invention will be obvious to those skilled in the art and it is intended to cover all such modifications and equivalents.

What is claimed is:

1. An apparatus for indicating an angle of an object relative to both level and plumb comprising:
   an L-shaped frame comprising a first side and a second side substantially perpendicular to said first side;
   a first indicating apparatus disposed on said L-shaped frame and configured to indicate an angle of a first axis relative to level;
   a second indicating apparatus disposed on said L-shaped frame and configured to indicate an angle of a second axis relative to level; and
   wherein said second indicating apparatus is at least partially disposed on said first side of said L-shaped frame and wherein said first indicating apparatus and said second indicating apparatus are both at least partially displayed on said first side of said L-shaped frame;
   wherein said first indicating apparatus and said second indicating apparatus are at least partially embedded within said L-shaped frame; and
   wherein said first indicating apparatus comprises a first indicator disk and wherein said second indicating apparatus comprises a second indicator disk and wherein said first indicating apparatus and said second indicating apparatus comprise a weighted portion and further wherein said first indicator disk and said second indicator disk each comprise a diameter and an edge having a thickness.

2. The apparatus of claim 1 wherein said first and second indicating apparatuses are positioned such that both are observable from a single location without repositioning said L-shaped frame.

3. The apparatus of claim 2 wherein said first and said second indicating apparatuses are observable at the same time.

4. The apparatus of claim 1 further comprising at least one window disposed on a single side of said L-shaped frame through which said first and said second indicating apparatuses are both at least partially displayed.

5. The apparatus of claim 1 further comprising a first window disposed on said first side of said L-shaped frame and through which said first indicating apparatus is at least partially displayed, and a second window disposed on said first side of said frame and through which said second indicating apparatus is at least partially displayed.

6. The apparatus of claim 1 wherein at least one of said first and second indicating apparatuses comprises a pin disposed at the center of orientation of said first and second indicating apparatuses.

7. The apparatus of claim 6 wherein said pin is attached to said L-shaped frame such that said pin is immovable.

8. The apparatus of claim 7 wherein said pin passes entirely through at least one of said first indicating apparatus or said second indicating apparatus.

9. The apparatus of claim 8 wherein said weighted portion of said first indicating apparatus is at least partially contained within said first indicator disk, and said weighted portion of said second indicating apparatus is at least partially contained within said second indicator disk.

10. The apparatus of claim 1 further comprising a first pin about which said first indicator disk rotates and further comprising a second pin about which said second indicator disk rotates and wherein said first pin comprises a primary axis which is at least substantially perpendicular with respect to a primary axis of said first side of said L-shaped frame and said second pin comprises a primary axis which is at least substantially perpendicular with respect to a primary axis of said second side of said L-shaped frame and further wherein said primary axis of said first pin is at least substantially perpendicular with said primary axis of said second pin.

11. The apparatus of claim 10 further comprising a first window disposed on said first side of said L-shaped frame through which at least a portion of said diameter of said first indicator disk or said second indicator disk is visible and further comprising a second window disposed on said first side of said L-shaped frame through which at least a portion of said edge of said second disk is visible.

12. The apparatus of claim 1 wherein at least one of said first indicating apparatus or said second indicating apparatus comprises a pointer.

13. The apparatus of claim 12 wherein said at least one of said first indicating apparatus or said second indicating apparatus comprises an extension arm configured to extend said pointer in a perpendicular direction to the direction of gravity.

14. The apparatus of claim 1 further comprising an electronic display and an array of lights arranged in distinct patterns.

15. The apparatus of claim 14 wherein said electronic display displays at least two digital numbers, one of said at least two digital numbers indicating the angle of the object relative to level and another of said at least two digital numbers indicating the angle of the object relative to plumb.

16. The apparatus of claim 1 further comprising magnets.

17. The apparatus of claim 1 further comprising markings on said L-shaped frame indicating various angles.

* * * * *